US012711435B1

(12) United States Patent
Garg et al.

(10) Patent No.: US 12,711,435 B1
(45) Date of Patent: Aug. 18, 2026

(54) SYSTEM, METHOD, AND COMPUTER PROGRAM FOR USING MACHINE LEARNING TO IMPROVE VISUALIZATION TOOLS FOR EXPLORING CAREER OPPORTUNITIES

(71) Applicant: Eightfold AI Inc., Mountain View, CA (US)

(72) Inventors: Ashutosh Garg, Mountain View, CA (US); Sanjeet Hajarnis, Mountain View, CA (US); Niran Kundapur, Mountain View, CA (US); Ashutosh Madeshiya, Mountain View, CA (US); Xia Zhou, Mountain View, CA (US)

(73) Assignee: Eightfold AI Inc., Santa Clara, CA (US)

( * ) Notice: Subject to any disclaimer, the term of this patent is extended or adjusted under 35 U.S.C. 154(b) by 333 days.

(21) Appl. No.: 16/750,964

(22) Filed: Jan. 23, 2020

(51) Int. Cl.
*G06Q 10/0631* (2023.01)
*G06Q 10/1053* (2023.01)

(52) U.S. Cl.
CPC . *G06Q 10/063112* (2013.01); *G06Q 10/1053* (2013.01)

(58) Field of Classification Search
CPC .................. G06Q 10/063112; G06Q 10/1053
USPC ........................................................ 705/7.14
See application file for complete search history.

(56) References Cited

U.S. PATENT DOCUMENTS

2007/0203710 A1* 8/2007 Habichler .......... G06Q 10/1053 705/320
2013/0212031 A1* 8/2013 Barnfield ............... G06Q 10/06 705/320
2019/0378017 A1* 12/2019 Kung ..................... G06N 3/084
2020/0302371 A1* 9/2020 Mathiesen ....... G06Q 10/06398

FOREIGN PATENT DOCUMENTS

WO WO-2018039536 A1 * 3/2018 ........... G06Q 10/067
WO WO-2021137848 A1 * 7/2021 ............... G06N 3/08

OTHER PUBLICATIONS

Successfactors, Career and Development Plan, Jan. 6, 2012, https://web.archive.org/web/20120106094022/https://www.successfactors.com/development-training/, p. 1.*
Quora (Thomas), Is there software to visualize your skill / career path? Something like in skill tree in Diablo 2., 2018, https://www.quora.com/Is-there-software-to-visualize-your-skill-career-path-Something-like-in-skill-tree-in-Diablo-2, p. 1, 4 (1-8).*

* cited by examiner

*Primary Examiner* — Jerry O'Connor
*Assistant Examiner* — James Webb
(74) *Attorney, Agent, or Firm* — Zhong Law, LLC

(57) ABSTRACT

A system and method for identifying target jobs relevant to a talent profile and presenting career paths to achieve the target jobs include a processing device to identify a talent profile associated with an employee, the talent profile comprising at least one of an employment role held by the employee or a job skill of the employee, identify a plurality of jobs available to the employee, determine, from the plurality of jobs, one or more target jobs based on a (Continued)

relevancy measurement between the talent profile and each of the plurality of jobs, and present, on a graphical user interface implemented on the interface device, a first career path from a first graphic representation representing the employee to a second graphic representation representing a first one of the one or more target jobs.

18 Claims, 7 Drawing Sheets

SYSTEM, METHOD, AND COMPUTER PROGRAM FOR USING MACHINE LEARNING TO IMPROVE VISUALIZATION TOOLS FOR EXPLORING CAREER OPPORTUNITIES

TECHNICAL FIELD

The present disclosure relates to improvements to technical solutions that facilitate employees to explore career opportunities in an organization, and in particular to a system, method, and storage medium including executable computer programs for using machine learning technologies to improve visualization tools designed for exploring these career opportunities.

BACKGROUND

An organization may be composed of employees. The organization can be a company, a nonprofit organization, or a government agency. The employees of the organization may include experienced and new employees. The new employees may include fresh recruits from schools with little prior work experience.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
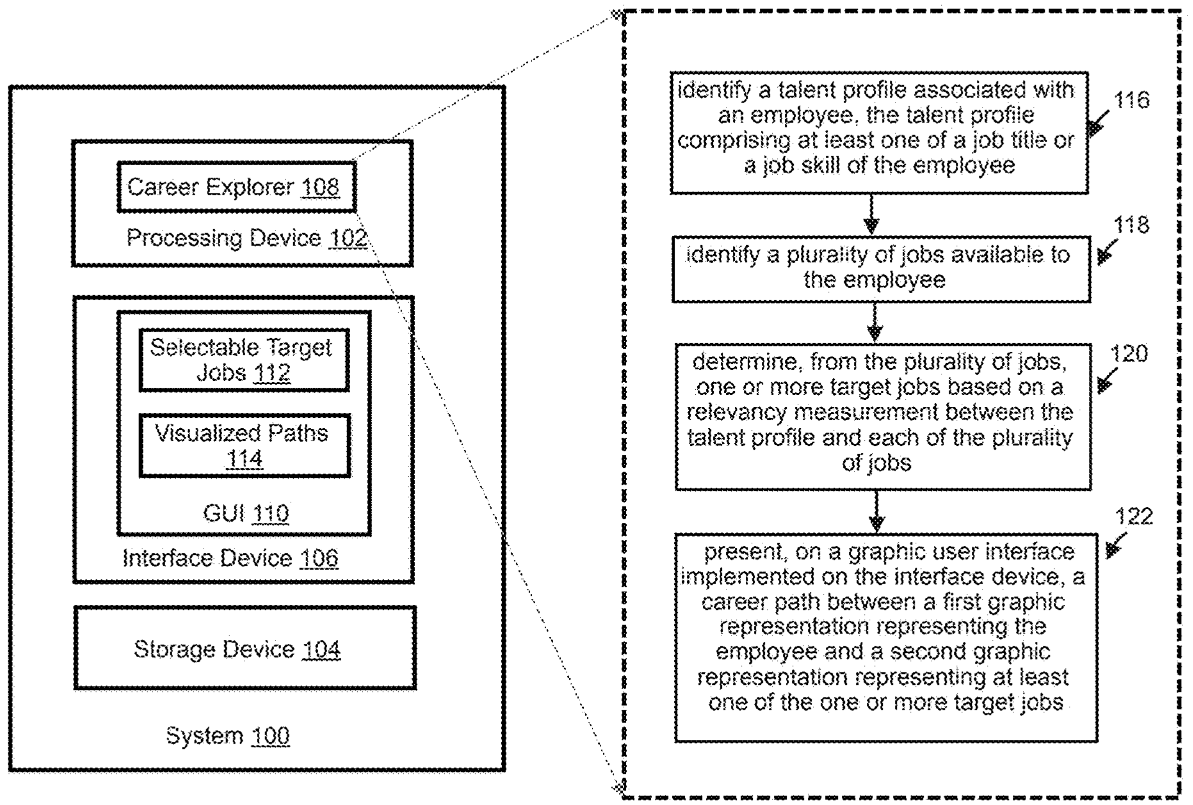
FIG. 1 illustrates a system for providing a computer-implemented visualization tool for exploring career opportunities according to an implementation of the disclosure.

Employee recruitment and training play an important role in the operation of the organization. An employee in this disclosure refers to a person currently working for the organization based on a contract (e.g., a permanent employment contract or a termed employment contract) or a person seeking to work for the organization. In other words, an employee in this disclosure can be a current employee, a contractor, or a potential employee. Employee recruitment and training can be a major cost to the operation of the organization. The organization commonly desires to define a job title and role for an employee, train the employee with skills to adequately perform the job, and retain the service of the employee for an extended period of time. The longer a qualified employee stay with the organization, the less costs the organization may spend on employee recruitment and training.

An employee may be more satisfied with his or her position and thus tend to remain with an organization if the employee can identify career goals and paths to achieve these career goals through opportunities offered by the organization. When the employee is unable to plan his or her career goals and the paths to achieve these goals, the employee may become less satisfied with his or her current job, thus increasing the tendency of moving to another employer. This issue may be particularly relevant for employees with little working experience such as recent college graduates, because they have little or no prior working experience, and they are not familiar with opportunities within the organization.

From the employer point of view, it is difficult and expensive for the organization to provide personalized career planning for each employee. The organization may provide the employees with opportunities (e.g., job advancements and job openings) through career presentations. Career presentations are typically static documents without a personal touch. The static documents may include textual description and illustrations associated therewith. Although the static documents may present the options available to the employee, the static documents are not personalized, thus lacking flexibility and visibility to meet each employee's individual needs. Further, the static documents do not permit the employee to dynamically explore different career goals and the diverse paths to achieve these career goals within the organization. Therefore, there is a need for technical solutions that allow employees to dynamically explore all possible career goals and the paths to achieve these career goals in a clear and intuitive manner.

Implementations of the disclosure provide a computer-implemented visualization tool that allow an employee to select graphic representations of career goals on a graphical user interface (GUI) and correspondingly present, on the GUI, the paths to achieve these career goals. Visualization in this disclosure refers to computer technologies that creates images, diagrams, or animations presented on a GUI supported by a display device (e.g., a computer monitor or screen) to communicate one or more messages. By selecting different career goals, the employee may dynamically explore in real time different career paths from his or her current position to achieve these goals, thus intuitively learning the many opportunities available in the organization, skills to be learned, and how to take advantage of these opportunities. A career path in this disclosure refers to one or more future jobs that may lead an employee to a future career objective (e.g., an ultimate job). Thus, a career path may be composed of two or more jobs including a starting position (e.g., the current job) and future jobs as well as a progressing through these jobs based on skill sets and work experience. In this way, the employee may reduce certain perceived career uncertainties associated working at the organization, thus increasing the employee's career ownership with the organization. The organization may provide a valuable but cost-effective service to the employees by leveraging the technical solutions described in the disclosure.

A large organization with hundreds or thousands employees may have a large quantity of opportunities available for employees to explore. While one of the objectives is to present all opportunities available in the organization to the employee, in practice, the presentation of all or almost all opportunities available in the organization on a screen with a limited display area may clutter the presentation and result in a less effective visualization tool. To solve this technical problem in computer-implemented visualization of career paths, implementations of the disclosure may provide a machine learning engine that may identify, based on information relating to the employee and the organization, target jobs that are most relevant to the employee. The computer-implemented visualization tool may then present the identified relevant target jobs on the GUI in a clear and sensible manner. Thus, implementations of the disclosure include improvements to the computer visualization technologies using machine learning technologies and, in the meantime, solve the practical problems of helping employees plan career paths and maintaining a high retention rate at the organization.

FIG. 1 illustrates a system 100 for providing a computer-implemented visualization tool 108 (referred to hereinafter as the "career explorer") for exploring career opportunities according to an implementation of the disclosure. System 100 can be a standalone computer system or a networked computing resource implemented in a computing cloud. Referring to FIG. 1, system 100 may include a processing device 102, a storage device 104, and an interface device 106, where the storage device 104 and the interface device 106 are communicatively coupled to processing device 102.

Processing device 102 can be a hardware processor such as a central processing unit (CPU), a graphic processing unit (GPU), or an accelerator circuit. Interface device 106 can be a display such as a touch screen of a desktop, laptop, or smart phone. Storage device 104 can be a memory device, a hard disc, or a cloud storage connected to processing device 102 through a network interface card (not shown).

Processing device 102 can be a programmable device that may be programmed to implement a graphical user interface 110 presented on interface device 106. Graphical user interface ("GUI") 110 allows a user using an input device (e.g., a keyboard, a mouse, and/or a touch screen) to interact with graphic representations (e.g., icons) presented on GUI 110. In one implementation, GUI 110 may include graphic representations 112 representing target jobs identified by career explorer 108 as relevant based on a relevancy measurement between a talent profile of an employee and jobs available to the employee in the organization. GUI 110 may also include graphic representations representing career paths 114 connecting from a graphic representation representing the employee to one or more graphic representations representing the target jobs. The career paths may include information of how to achieve the target jobs from the employee's current position. In this way, implementations of the disclosure may provide a clear and intuitive tool for the employee to explore different opportunities available in the organization and make intelligent career planning.

In one implementation, career explorer 108 can be a standalone application executed by processing device 102 or can be incorporated into GUI 110 as an add-on function. Career explorer 108, when executed by processing device 102 at the command of an employee, may identify a talent profile associated with the employee, the talent profile including at least one of a job title or a job skill possessed by the employee, identify all jobs available to the employee within the organization, determine, from the jobs, one or more target jobs based on a relevancy measurement between the talent profile and each of the jobs, and present, on a graphical user interface 110 implemented on the interface device 106, a career path from a first graphic representation representing the employee to a second graphic representation representing a first one of the one or more target jobs.

The following sections describe operations of career explorer 108 in detail. Career explorer 108, when activated, may, at 116, identify a talent profile associate with an employee. In one implementation, career explorer 108 is activated in response to the employee logging into or otherwise identified to career explorer 108. In another implementation, a career coach (e.g., a human resource (HR) manager) may log into career explorer 108 and select the talent profile of the employee for exploring the career. The talent profile is a document containing information relating to the employee. The talent profile may be stored in a HR database accessible by processing device 102. The talent profile may contain linguistic expressions that describe different aspects of the employee including an employment role (e.g., job titles) or job skills held by the employee. Examples of job titles may include "Lead Frontend Engineer," and the job skills may include "C++, Java, Python, Algorithm, SQL, Linux, Android etc." The talent profile may further include an education history including schools attended by the employee, fields studied by the employee, and/or professional certificates obtained by the employee. The talent profile may also include personality assessment of the employee given by a supervisor or peers of the employee. The linguistic expressions can be in any language such as English, German, French. The linguistic expressions can be a word, a phrase, or a sentence containing one or more words associated with certain semantic meanings. In additional to obtaining the talent profile from the HR database within the organization, implementations may enrich the talent profile by acquiring information relating to the employee from other sources including the external profiles of the employees in the public domain. The external profiles may include an external professional web page (e.g., LinkedIn page), a list of publications made by the employee, and professional contributions (e.g., open source code contributions, responses to questions in technical forums). The information contained in the external profiles may help further understand the career potential of the employee.

In one implementation, at 118, career explorer 108 may identify jobs in the organization that are available to the employee. The jobs available to the employee may include all the jobs that require additional skills than those the employee currently possess and/or require additional years of working experience than the employee's work experience. In one implementation, each of the jobs of an organization may be associated with a ranking level. Thus, all the jobs in the organization may be ranked in accordance with an order from the entry level to the senior management. The jobs available to the employee can be those with higher ranking levels than the current ranking level held by the employee. Each of the jobs may be specified by a job profile. The job profile may include, but not limited to, a title and ranking level of the job, and skills required to perform the job, a minimum number of years of working experience. When the organization is large, the jobs available to the employee can be abundant (e.g., hundreds or thousands). Some of these jobs may be too remote along the career path of the employee (e.g., a senior management position with respect to an entry level assistant). Some of these jobs may be out of the scope of the employee's training (e.g., a senior software architect position with respect to a finance analyst). When all these jobs are presented on GUI 110, they may clutter the display area, causing an ineffective presentation of the career paths to the user of career explorer 108.

To make a clean and effective visual presentation of career paths to the user, career explorer 108 may prune the large number of jobs available to the employee and narrow down the jobs to a subset of target jobs that are relevant to the employee. In one implementation, at 120, career explorer 108 may determine, from all the jobs available to the employee, one or more target jobs based on a relevancy measurement between the talent profile of the employee and each of the jobs. The relevancy measurement can be a parameter value indicating the likelihood that the employee with current talent profile advances to a future target job. The relevancy value can be defined within a certain numerical range (e.g., [0, 1]) with the value indicating the likelihood (e.g., 0 indicates no relevancy; 1 indicates very strong relevancy). In one implementation, a threshold value may be used as the boundary between target jobs and non-target jobs for the employee.

Figure 2:
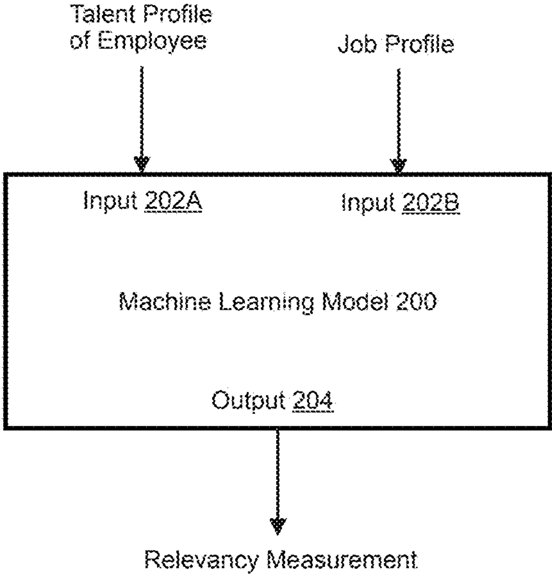
FIG. 2 illustrates a machine learning model according to an implementation of the disclosure.

In one implementation, career explorer 108 may employ a machine learning model taking into consideration the talent profile and the job profiles associated with jobs available to the employee to calculate the relevancy measurements. A machine learning model can be a parameterized representation that may be used to calculate the relevancy measurement. The machine learning model can be a suitable statistical model or a deep neural network (DNN). FIG. 2 illustrates a machine learning model 200 according to an implementation of the disclosure. In one implementation, machine learning model 200 may be a deep neural network that may include multiple layers, in particular including an input layer for receiving data inputs, an output layer for generating outputs, and one or more hidden layers that each includes linear or non-linear computation elements (referred to as neurons) to perform the DNN computation propagated from the input layer to the output layer that may transform the data inputs to the outputs. Two adjacent layers may be connected by edges. Each of the edges may be associated with a parameter value (referred to as a synaptic weight value) that provide a scale factor to the output of a neuron in a prior layer as an input to one or more neurons in a subsequent layer.

Referring to FIG. 2, machine learning model 200 may include an input layer including a first input 202A to receive a talent profile of the employee and a second input 202B to receive the job profile associated with a job available to the employee. As discussed above, the talent profile may be a document including information relating to the employee conducting career exploration. The information relating to the employee may include aspects obtained from the HR database and may also include aspects obtained from external data sources such as professional web page, publications, and professional contributions to the public domains. Thus, the talent profile of the employee received at input 202A may include information beyond commonly available to an HR manager within the organization. Similarly, at discussed above, a job profile received at input 202B may include, but not limited to, a title and ranking level of the job, and skills required to perform the job, a minimum number of years of working experience. The job can be in a rank level that is one or more levels above the current job held by the employee. The machine learning model 200 may include an output layer including output 204 to produce a relevancy measurement, where the relevancy measurement is a parameter indicating the likelihood that the employee with current talent profile advances to a future target job. In the example as shown in FIG. 2, the calculated relevancy measurement may indicate the likelihood that the employee advances from his or her current job title based on the talent profile to the job described in the job profile received at 202B.

Responsive to receiving the talent profile of the employee at 202A and the job profile at 202B, processing device 102 may execute machine learning model 200 to calculate the relevancy measurement between the employee and the job at output 204. In one implementation, the relevancy measurement may be served as a prediction indicator that may be used to predict which job is relevant to the employee. For example, if the relevancy measurement is greater than a threshold value, the job is predicted, among all jobs, relevant to the employee. In another implementation, the relevancy measurement can be a correlation indicator that may be used to indicate how closely a job is related to an employee. For example, if the relevancy measurement is greater than a threshold value, the job is closely related, among all jobs, to the employee. In either case, the employee is determined to be relevant to the job or not through machine learning model 200. FIG. 2 illustrates using machine learning model 200 to calculate the relevancy measurement between the talent profile of an employee and a job profile. For an organization with multiple employees and multiple job opportunities, the machine learning model 200 may be applied to each pair of employee and job to calculate the corresponding respective relevancy measurement.

Machine learning in this disclosure refers to methods implemented on hardware processing device that uses statistical techniques and/or artificial neural networks to give computer the ability to learn as the computer progressively improves performance on a specific task, from data without being explicitly programmed. The machine learning may use a parameterized model (referred to as "machine learning model") that may be deployed using supervised learning/semi-supervised learning, unsupervised learning, or reinforced learning methods. Supervised/semi-supervised learning methods may train the machine learning models using labeled training examples. To perform a task using supervised machine learning model, a computer may use examples (commonly referred to as "training data") to test the machine learning model and to adjust parameters of the machine learning model based on a performance measurement (e.g., the error rate). The process to adjust the parameters of the machine learning model (commonly referred to as "train the machine learning model") may generate a specific model that is to perform the practical task it is trained for. After training, the computer may receive new data inputs associated with the task and calculate, based on the trained machine learning model, an estimated output for the machine learning model that predicts an outcome for the task. Each training example may include input data and the corresponding desired output data, where the data can be in a suitable form such as a vector of numerical alphanumerical symbols.

The learning process of the machine learning model may be an iterative process. The process may include a forward propagation process to calculate an output based on the machine learning model and the input data fed into the machine learning model, and then calculate a difference between the desired output data and the calculated output data. The process may further include a backpropagation process to adjust parameters of the machine learning model based on the calculated difference.

In implementations of the disclosure, the training data may be derived from historical data of career paths of employees (past, current and/or future employees, including job applicants) associated with the organization. The relevancy measurement may be set based on a number of factors such as a success percentage of employees advancing from a first job position to a second job position, and/or success and failure percentages of acquiring an advanced skill (e.g., software architecture design) based on a technical background (e.g., Python, information technology), and/or success and failure percentages of an employee advancing to a managerial position based on personality assessment. A specific machine learning model 200 may be constructed through the training process using the train data set.

Processing device 102 may execute machine learning model 200 to determine, based on the relevancy measurement, one or more target jobs out of all jobs available to the employee. The target jobs can be those whose relevancy measurement is higher than a threshold value. The number of target jobs is smaller than the total number of jobs and is determined highly relevant to the career paths of the employee. At 122, career explorer 108 may present, on GUI 110, a career path between a first graphic representation representing the employee and a second graphic representation representing at least one of the target jobs. In this way, career paths of the employee are visualized in a clear and sensible manner.

Figure 3A:
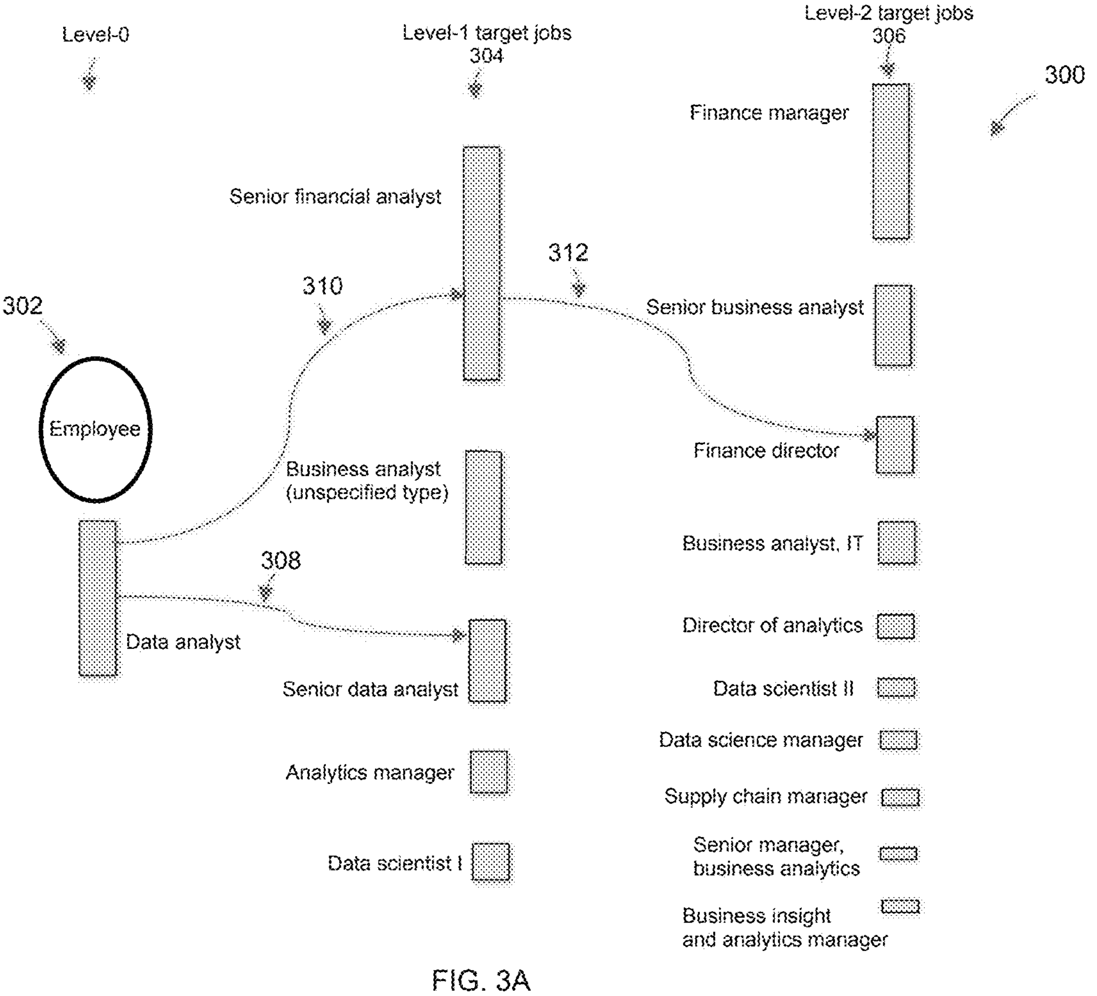
FIGS. 3A-3C illustrate graphical user interfaces of career planner according to implementations of the disclosure.
Figure 3B:
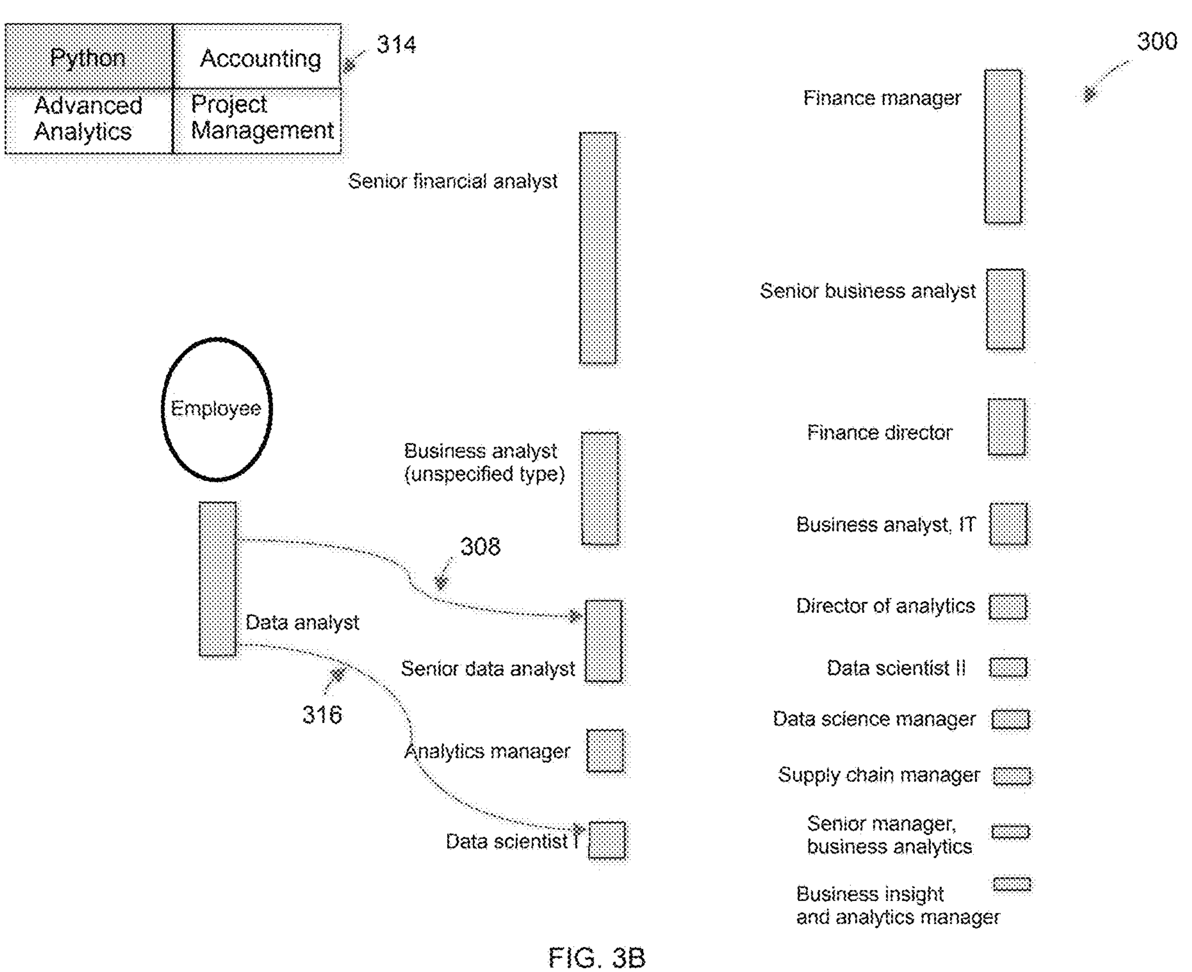
Figure 3C:
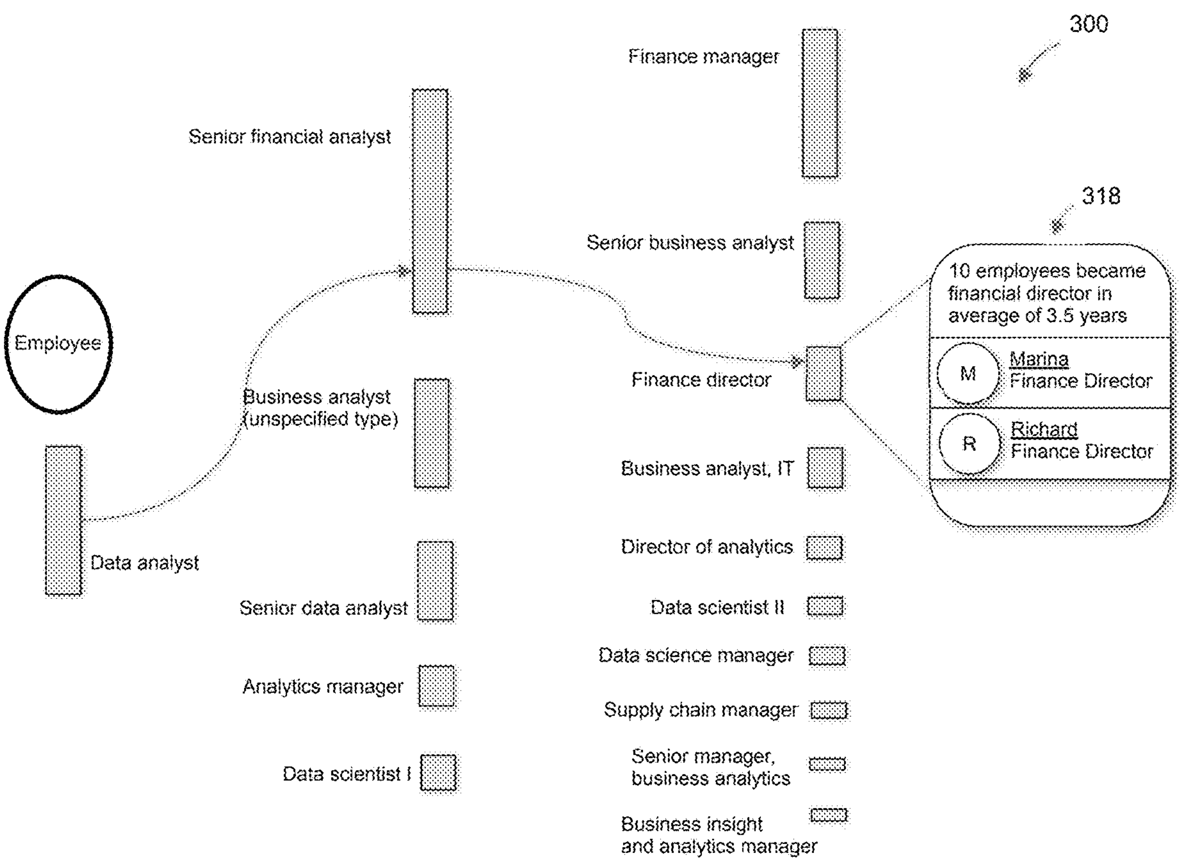

GUI 110 may include graphic representations of the employee, target jobs, and career paths. FIGS. 3A-3C illustrate graphical user interfaces of career planner according to implementations of the disclosure. Referring to FIC. 3A, a graphical user interface 300 may include a graphic representation 302 representing an employee associated with a talent profile. The employee may be associated with a job title such as a "data analysist." Based on the relevancy measurement calculated by executing the machine learning model 200, career explorer 108 may determine one or more target jobs relevant to the employee. The target jobs can be in one or more ranking levels above the current ranking level of the job held by the employee. In this example, the employee 302 may hold a "data analyst" job at ranking level 0, and the target jobs include level-1 target jobs 304 and level-2 target jobs 306, where level 1 is the immediate ranking level above level 0, and level 2 is the immediate ranking level above level 1. Employee 302 may advance directly from the current job at ranking level 0 to a target job at ranking level 1, and may advance from the current job to a target job at level 2 through at least one target job in level 1.

In one implementation, career explorer 108 may determine a target job (e.g., senior data analyst) with the highest relevancy measurement and present a second graphic representation representing the career path 308 between the first graphic representation of the employee to the second graphic representation of the target job of "senior data analyst." While the career path 308 is represented using the graphic representation of curves, it is understood that the curve representation is one of many possible implementations of graphic representations of career paths. Other possible graphic representations can be, without limitation, straight lines, clouds of dots etc. In one implementation, the graphic representations of target jobs can be icons that are selectable by a user action. In this case, a user may select a specific target job and view the career paths to achieve the selected target job. For example, as shown in FIG. 3A, a user may select the graphic representation of "finance director" as a career objective. Responsive to the user action selecting "finance director," career explorer 108 may determine that the most relevant career paths include a first career path 310 from the "data analyst" job held by the employee to the "senior financial analyst" in the level-1 target jobs 304, and a second career path 312 from the "senior financial analyst" in the level-1 target jobs 304 to the "finance director" in the level-2 target jobs 306. In this way, career explorer 108 may utilize graphical user interface 300 to present career paths for the employee 302 to different target jobs.

In addition to the visualization of career paths, graphical user interface 300 may also present information relating to these career paths. In one implementation, career explorer 108 may determine elements that the employee may need to acquire to advance from the current position to a target job along the career path. For example, as shown in FIG. 3B, career explorer 108 may determine the skills that the employee currently does not possess but are required by the target jobs, and present these skills in a skill panel 314 on graphical user interface 300. Skill panel 314 may include selectable icons representing different skills (e.g., "Python," "Accounting," "Advanced Analytics," "Project Management"). Responsive to a user action selecting a skill (e.g., "Python") on skill panel 314, career explorer 108 may present career paths 308, 316 indicating that the addition of "Python" skill may qualify the employee for "senior data analyst" or "data scientist." Alternatively, the user may remove a selected skill. Responsive to a user action to unselect a skill (e.g., the already selected "Python"), career explorer 108 may cause removal of one or both career paths 308, 316 from graphical user interface 300. In another implementation, responsive to a user action selecting a target job (e.g., "data scientist"), career explorer 108 may highlight the skills (e.g., "Python") on skill panel 314 to indicate that the target job requires these highlighted skills. In one implementation, skill panel 314 may include input fields to allow the user to enter or specify certain skills that are not shown in the skill panel. The user-specified skills allow the user to explore those skills that interest the user and explore what the career paths would look like if the user acquires these skills. For example, as shown in FIG. 3B, "Python" can be a user-specified skill. Responsive to a user action to add "Python" to skill panel 314, career explorer 108 may cause to present career paths 308, 316 to "senior data analyst" and "data scientist" that require the "Python" skill. Responsive to a user action to remove "Python" to skill panel 314, career explorer 108 may cause to remove career paths 308, 316 from graphical user interface 300.

Each graphic representation of a target job may also encode information regarding the target job. For example, the length of the graphic representation of a corresponding target job may proportionally indicate the number of the target jobs available in the organization. As shown in FIGS. 3A-3C, the number of "senior financial analysts" is higher than the number of "business analysts" which in turn is higher than the number of "senior data analysts," and so forth. Thus, the user may intuitively determine which target job has more opportunities. Further, implementations of the disclosure may provide model employees associated with target jobs. For example, as shown in FIG. 3C, career explorer 108 may provide graphical user interface 300 that allows a user to use an input device (e.g., a mouse or a touchscreen) to select a target job (e.g., "finance director") causing the presentation of career paths to "finance director" and concurrently, an information panel 318 including statics relating to "finance director." Information panel 318 may include the number of employees who hold the title and the average of number of years to advance from a "data analyst" position to the "finance director" position. Additionally, information panel 318 may also include selected employees that hold the "finance director" position. This allows the user to further drill down on the information of a particular employee and contact the employee directly (e.g., through e-mail) for career advice.

Figure 4:
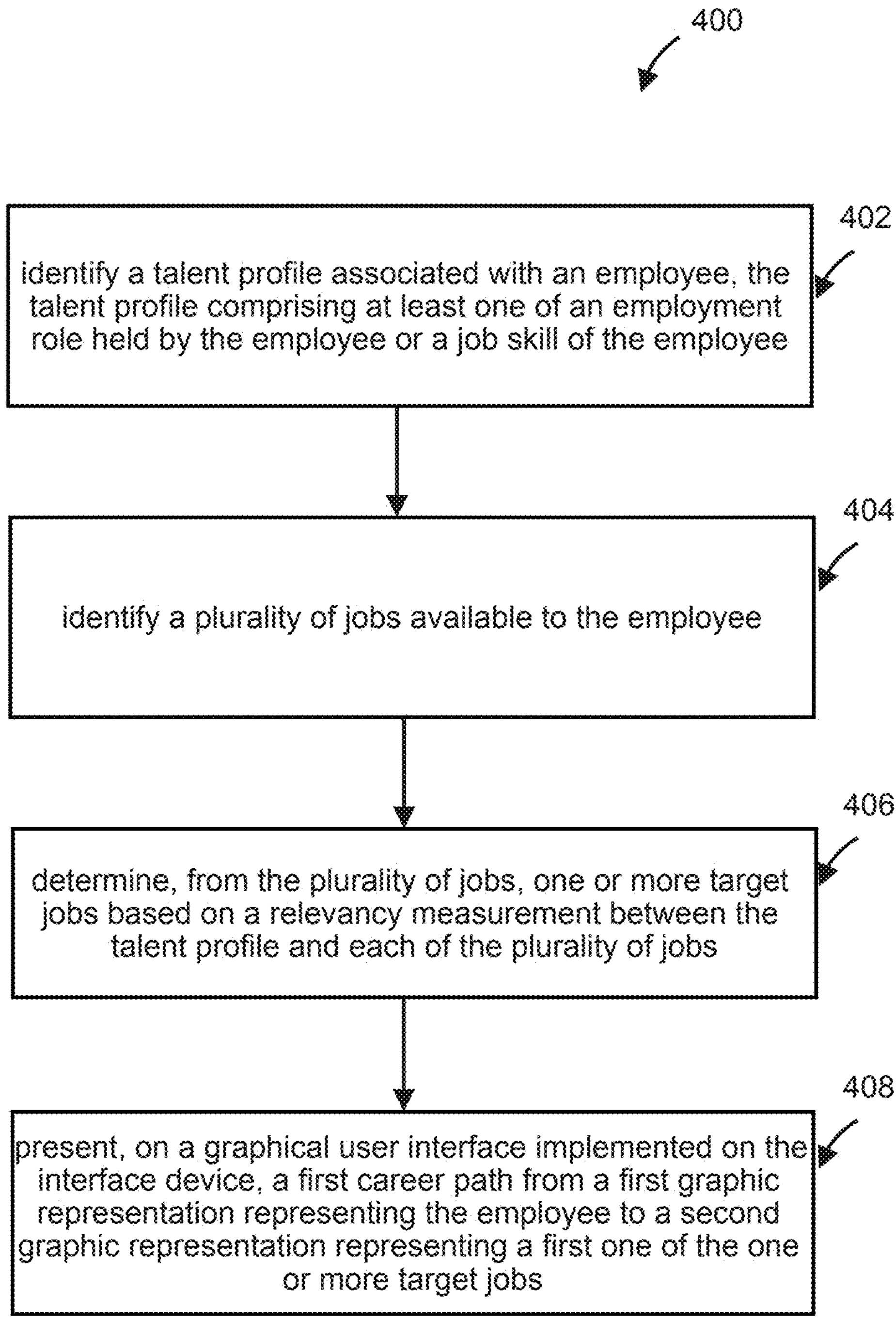
FIG. 4 illustrates a flowchart of a method to perform career explorer according to an implementation of the disclosure.

FIG. 4 illustrates a flowchart of a method 400 for exploring career according to an implementation of the disclosure. Method 400 may be performed by processing devices that may comprise hardware (e.g., circuitry, dedicated logic), computer readable instructions (e.g., run on a general purpose computer system or a dedicated machine), or a combination of both. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a processing device 102 executing career explorer 108 as shown in FIG. 1.

As shown in FIG. 4, processing device 102 may, at 402, identify a talent profile associated with an employee, the talent profile comprising at least one of an employment role held by the employee or a job skill of the employee.

At 404, processing device 102 may identify a plurality of jobs available to the employee.

At 406, processing device 102 may determine, from the plurality of jobs, one or more target jobs based on a relevancy measurement between the talent profile and each of the plurality of jobs.

At 408, processing device may present, on a graphical user interface implemented on the interface device, a first career path from a first graphic representation representing the employee to a second graphic representation representing a first one of the one or more target jobs.

Figure 5:
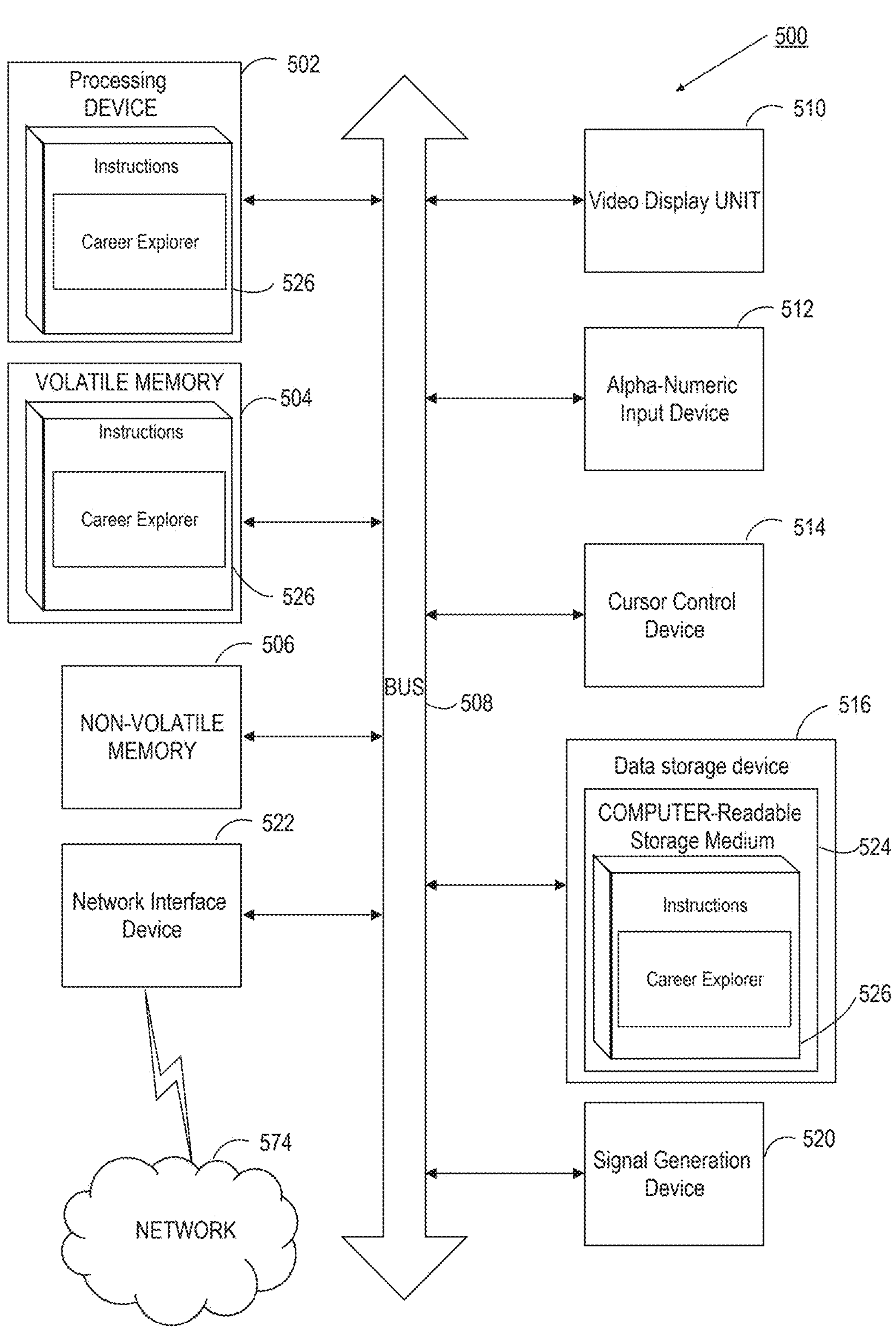
FIG. 5 depicts a block diagram of a computer system operating in accordance with one or more aspects of the present disclosure.

FIG. 5 depicts a block diagram of a computer system operating in accordance with one or more aspects of the present disclosure. In various illustrative examples, computer system 500 may correspond to the processing device 102 of FIG. 1.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions of the career explorer 108 of FIG. 1 for implementing method 400.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system implemented by one or more computers for identifying target jobs relevant to a talent profile and presenting career paths to achieve the target jobs, the one or more computers comprising:

an interface device; and a processing device, communicatively connected to the interface device, to:

identify a talent profile associated with an employee, the talent profile comprising at least one of an employment role held by the employee or a job skill of the employee;

identify a plurality of job profiles available to the employee;

execute a neural network module to calculate a respective relevancy measurement between the talent profile and each of the plurality of job profiles, wherein parameters of the neural network module are adjusted using an iterative training in one or more training sessions based on training data in a training dataset, and wherein the iterative training of the neural network module iteratively includes: calculating a predicted relevancy measurement as an output based on an example input training data, calculating a difference value between the predicted relevancy measurement and a target relevancy measurement, and adjusting one or more parameters of the neural network module based on the difference value between the predicted relevancy measurement and the target relevancy measurement;

determine, by comparing the relevancy measurements between the talent profile and the plurality of jobs against a threshold value, a subset of the plurality of jobs, the subset comprising one or more target jobs;

determine, based on a comparison of the talent profile and skills required for the one or more target job profiles, one or more skills that are missing from the talent profile of the employee and that the employee needs to gain to advance to the one or more target jobs; and present, in a skill panel located in a first region on a graphical user interface, graphic representations representing the one or more skills that are missing from the talent profile of the employee, wherein at least one of the graphic representations representing the one or more skills in a skill panel is selectable, and responsive to detecting a selection of the at least one of the graphic representations representing the one or more skills, present, in a second region concurrently along with the skill panel on the graphic user interface, a first career path from a first graphic representation representing the employee to a second representation representing a first one of the one or more target jobs, and responsive to detecting unselecting of the previously selected at least one of the graphic representations representing the one or more skills, remove the first career path from the first graphic representation representing the employee to the second representation representing the first one of the one or more target jobs, wherein the first career path requires the at least one skill represented by the selected at least one graphic representation.

2. The system of claim 1, wherein the processing device is further to:

responsive to detecting a user selection of a third graphic representation representing a second one of the one or more target jobs, present, on the graphical user interface, a second career path from the first graphic representation representing the employee to the third graphic representation representing the second one of the one or more target jobs.

3. The system of claim 1, wherein one or more target jobs comprise a first level of target jobs that are directly connectable to the first graphic representation by career paths, and a second level of target jobs that are connectable to the first graphic representation through at least one of the first level of target jobs.

4. The system of claim 3, wherein the processing device is further to:

responsive to detecting a user selection of a fourth graphic representation representing a first one of the first level of target jobs, present a third career path from the first graphic representation to the fourth graphic representation; and responsive to detecting a user selection of a fifth graphic representation representing a second one of the second level of target jobs, present a fourth career path from the fourth graphic representation to the fifth graphic representation.

5. The system of claim 1, wherein the talent profile further comprises at least one of a school, a field of study, and a professional certificate associated with the employee, and a personality assessment of the employee.

6. The system of claim 1, wherein to identify a plurality of jobs available to the employee, the processing device is to determine the plurality of jobs available to the employee based on the at least one of the employment role held by the employee or the job skill of the employee.

7. The system of claim 1, wherein the processing device is further to:

responsive to detecting a user selection of a sixth graphic representation representing a first one of the one or more skills in the skill panel, determine a third one of the one or more target jobs that requires the first one of the one or more skills; and present, on the graphical user interface, a fifth career path from the first representation to a seventh graphic representation representing the third one of the one or more target jobs.

8. The system of claim 1, wherein the processing device is further to:

exclude each of the plurality of jobs with the relevancy measurement that is not in the subset from the one or more target jobs.

9. The system of claim 1, wherein the processing device is further to:

associate each one of the one or more target jobs with one or more model employees who hold the each one of the one or more target jobs;

present, on the graphical user interface, summaries of career paths of the one or more model employees; and provide a communication channel for the employee to contact the one or more model employees.

10. A method for identifying target jobs relevant to a talent profile and presenting career paths to achieve the target jobs, the method comprising:

identifying, by a processing device, a talent profile associated with an employee, the talent profile comprising at least one of an employment role held by the employee or a job skill of the employee;

identifying, by the processing device, a plurality of job profiles available to the employee;

executing, by the processing device, a neural network module to calculate a respective relevancy measurement between the talent profile and each of the plurality of job profiles, wherein parameters of the neural network module are adjusted using an iterative training in one or more training sessions based on training data in a training dataset, and wherein the iterative training of the neural network module iteratively includes: calculating a predicted relevancy measurement as an output based on an example input training data, calculating a difference value between the predicted relevancy measurement and a target relevancy measurement, and adjusting one or more parameters of the neural network module based on the difference value between the predicted relevancy measurement and the target relevancy measurement;

determining, by the processing device by comparing the relevancy measurements between the talent profile and the plurality of jobs against a threshold value, a subset of the plurality of jobs, the subset comprising one or more target jobs;

determining, based on a comparison of the talent profile and skills required for the one or more target jobs, one or more skills that are missing from the talent profile of the employee and that the employee needs to gain to advance to the one or more target jobs; and presenting, in a skill panel located in a first region on a graphical user interface, graphic representations representing the one or more skills that are missing from the talent profile of the employee, wherein at least one of the graphic representations representing the one or more skills in a skill panel is selectable, and responsive to detecting a selection of the at least one of the graphic representations representing the one or more skills, presenting, in a second region concurrently along with the skill panel on the graphic user interface, a first career path from a first graphic representation representing the employee to a second representation representing a first one of the one or more target jobs, and responsive to detecting unselecting of the previously selected at least one of the graphic representations representing the one or more skills, removing the first career path from the first graphic representation representing the employee to the second representation representing the first one of the one or more target jobs, wherein the first career path requires the at least one skill represented by the selected at least one graphic representation.

11. The method of claim 10, further comprising:

responsive to detecting a user selection of a third graphic representation representing a second one of the one or more target jobs, presenting, on the graphical user interface, a second career path from the first graphic representation representing the employee to the third graphic representation representing the second one of the one or more target jobs.

12. The method of claim 10, wherein one or more target jobs comprise a first level of target jobs that are directly connectable to the first graphic representation by career paths, and a second level of target jobs that are connectable to the first graphic representation through at least one of the first level of target jobs.

13. The method of claim 12, further comprising:

responsive to detecting a user selection of a fourth graphic representation representing a first one of the first level of target jobs, presenting a third career path from the first graphic representation to the fourth graphic representation; and responsive to detecting a user selection of a fifth graphic representation representing a second one of the second level of target jobs, presenting a fourth career path from the fourth graphic representation to the fifth graphic representation.

14. The method of claim 10, wherein the talent profile further comprises at least one of a school, a field of study, and a professional certificate associated with the employee, and a personality assessment of the employee.

15. The method of claim 10, wherein identifying a plurality of jobs available to the employee further comprises determining the plurality of jobs available to the employee based on the at least one of the employment role held by the employee or the job skill of the employee.

16. The method of claim 10, further comprising:

responsive to detecting a user selection of a sixth graphic representation representing a first one of the one or more skills in the skill panel, determining a third one of the one or more target jobs that requires the first one of the one or more skills; and presenting, on the graphical user interface, a fifth career path from the first representation to a seventh graphic representation representing the third one of the one or more target jobs.

17. The method of claim 10, further comprising:

excluding each of the plurality of jobs with the relevancy measurement that is not in the subset from the one or more target jobs.

18. A machine-readable non-transitory storage media encoded with instructions that, when executed by one or more computers, cause the one or more computer to implement a system for identifying target jobs relevant to a talent profile and presenting career paths to achieve the target jobs, to:

identify a talent profile associated with an employee, the talent profile comprising at least one of an employment role held by the employee or a job skill of the employee;

identify a plurality of target job profiles available to the employee;

execute a neural network module to calculate a respective relevancy measurement between the talent profile and each of the plurality of job profiles, wherein parameters of the neural network module are adjusted using an iterative training in one or more training sessions based on training data in a training dataset, and wherein the iterative training of the neural network module iteratively includes: calculating a predicted relevancy measurement as an output based on an example input training data, calculating a difference value between the predicted relevancy measurement and a target relevancy measurement, and adjusting one or more parameters of the neural network module based on the difference value between the predicted relevancy measurement and the target relevancy measurement;

determine, by comparing the relevancy measurements between the talent profile and the plurality of jobs against a threshold value, a subset of the plurality of jobs, the subset comprising one or more target jobs;

determine, based on a comparison of the talent profile and skills required for the one or more target jobs, one or more skills that are missing from the talent profile of the employee and that the employee needs to gain to advance to the one or more target jobs; and present, in a skill panel located in a first region on a graphical user interface, graphic representations representing the one or more skills that are missing from the talent profile of the employee, wherein at least one of the graphic representations representing the one or more skills in a skill panel is selectable, and responsive to detecting a selection of the at least one of the graphic representations representing the one or more skills, present, in a second region concurrently along with the skill panel on the graphic user interface, a first career path from a first graphic representation representing the employee to a second representation representing a first one of the one or more target jobs, and responsive to detecting unselecting of the previously selected at least one of the graphic representations representing the one or more skills, remove the first career path from the first graphic representation representing the employee to the second representation representing the first one of the one or more target jobs, wherein the first career path requires the at least one skill represented by the selected at least one graphic representation.

* * * * *